US008037452B2

(12) United States Patent
Minium et al.

(10) Patent No.: US 8,037,452 B2
(45) Date of Patent: Oct. 11, 2011

(54) TASK AWARE SOURCE CHECKIN AND BUILD

(75) Inventors: Dennis W. Minium, Sammamish, WA (US); Douglas Todd Neumann, Cary, NC (US); Kevin Campbell Kelly, Chapel Hill, NC (US); Sam Guckenheimer, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1083 days.

(21) Appl. No.: 11/106,935

(22) Filed: Apr. 15, 2005

(65) Prior Publication Data

US 2006/0236301 A1  Oct. 19, 2006

(51) Int. Cl.
  *G06F 9/44* (2006.01)
  *G06F 17/00* (2006.01)
(52) U.S. Cl. ......... 717/122; 717/105; 717/168; 715/229
(58) Field of Classification Search .................... 717/101
  See application file for complete search history.

(56) References Cited

U.S. PATENT DOCUMENTS

| | | | | |
|---|---|---|---|---|
| 5,649,200 A * | 7/1997 | Leblang et al. | ............... | 717/122 |
| 6,151,643 A * | 11/2000 | Cheng et al. | .................... | 710/36 |
| 6,513,154 B1 * | 1/2003 | Porterfield | .................... | 717/101 |
| 6,601,233 B1 * | 7/2003 | Underwood | .................... | 717/102 |
| 6,698,013 B1 * | 2/2004 | Bertero et al. | ................. | 717/127 |
| 6,993,710 B1 * | 1/2006 | Coad et al. | .................... | 715/202 |
| 7,216,298 B1 * | 5/2007 | Ballard et al. | ................ | 715/760 |
| 7,222,131 B1 * | 5/2007 | Grewal et al. | ................ | 717/168 |
| 7,360,202 B1 * | 4/2008 | Seshadri et al. | .............. | 717/106 |
| 7,418,655 B2 * | 8/2008 | Ong | ............... | 715/229 |
| 7,484,171 B2 * | 1/2009 | Jeon et al. | .................... | 715/229 |
| 7,634,757 B2 * | 12/2009 | de Groot et al. | .............. | 717/122 |
| 7,676,793 B2 * | 3/2010 | Himmer et al. | ................ | 717/122 |
| 7,739,655 B1 * | 6/2010 | Monteiro et al. | ............. | 717/105 |
| 7,861,153 B2 * | 12/2010 | Ahyh et al. | .................... | 715/229 |
| 2002/0049962 A1 * | 4/2002 | Kelbaugh et al. | ............. | 717/128 |
| 2003/0126118 A1 * | 7/2003 | Burton et al. | ..................... | 707/3 |
| 2003/0135401 A1 * | 7/2003 | Parr | .................... | 705/8 |
| 2003/0182652 A1 * | 9/2003 | Custodio | ........................ | 717/122 |
| 2004/0060035 A1 * | 3/2004 | Ustaris | .......................... | 717/100 |

(Continued)

OTHER PUBLICATIONS

John Grundy, " Visual Specification and Moitoring of Software Agents in Decentralized processcentred environments" Deapartment of Computer Science, Universtiy of Waikato, Private Bag 3105, Hamilton, New Zealand, Nov. 3, 1998, pp. 1-20.*

(Continued)

*Primary Examiner* — Thuy Dao
(74) *Attorney, Agent, or Firm* — Woodcock Washburn LLP

(57) ABSTRACT

An integrated source code control and work item tracking tool is capable of establishing a relationship between work definition and work implementation. Once established, a more holistic view of the development process can be attained, and specific tasks can be easily accomplished. Tasks that may be accomplished using an integrated source code control and work item tracking tool include: automated generation of a list of work items that are completed in a new build of the system; automated updates of work items that are included in a build so that the work item details reflect the build in which it became available; automated transitioning of work items through a workflow when their implementation is complete and when their implementation is available in a new build; validation that source code changes represent the implementation of work items that have been approved; and managing change in the source code system with a focus on what work items it represents rather than a focus on what files are affected.

17 Claims, 6 Drawing Sheets

U.S. PATENT DOCUMENTS

2004/0117761 A1* 6/2004 Andrews et al. .............. 717/101
2006/0136904 A1* 6/2006 Weidman et al. ............. 717/172

OTHER PUBLICATIONS

"Tracking software projects with the integrated version control in SMIT", Mihajlovic et al., Mar. 2001, pp. 38-43, <http://delivery.acm.org/10.1145/510000/505787/p38-mihajlovic.pdf>.*

"Dynamic versioning concurrency control for index-based data access in main memory database systems", Xia et al., Oct. 2001, pp. 550-553, <http://delivery.acm.org/10.1145/510000/502686/p550-xia.pdf>.*

"Relevancy based access control of versioned XML documents", Iwaihara et al., Jun. 2005, pp. 85-94, <http://delivery.acm.org/10.1145/1070000/1063995/p85-iwaihara.pdf>.*

* cited by examiner

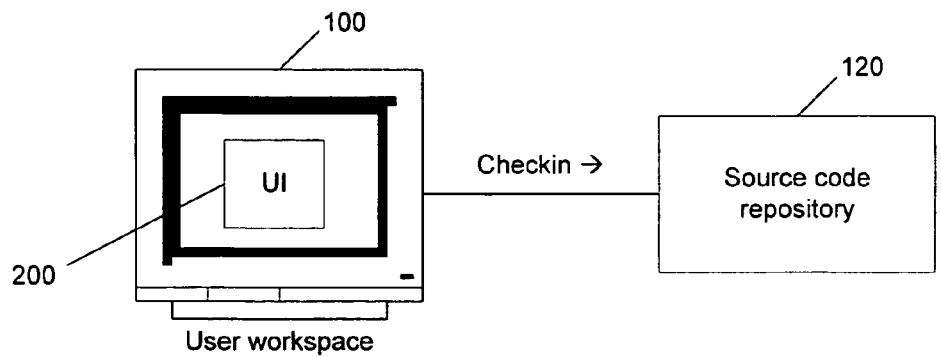

TASK AWARE SOURCE CHECKIN AND BUILD

FIELD OF THE INVENTION

The present invention relates generally to the field of software, and, more particularly, to leveraging the relationship between work items and source code control.

BACKGROUND OF THE INVENTION

Software development organizations frequently use a different system for managing source code than is used for managing the lists of work being performed by team members. Source code is typically managed in a source code control system that controls the evolution of source files and provides a workflow for collaborating on a team project. Work items are often managed in various tools including spreadsheets, project management tools, defect tracking tools, and requirements management systems, for example.

Source code represents the implementation of the work defined within the work item. However, because these items are managed in different systems, the underlying data models are not capable of establishing and maintaining a relationship between source code and work items.

In view of the foregoing, there is a need for systems and methods that overcome such deficiencies.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

An integrated source code control and work item tracking tool is capable of establishing a relationship between work definition and work implementation. Once established, a more holistic view of the development process can be attained, and specific tasks can be easily accomplished.

According to various aspects of the invention, example tasks that may be accomplished using an integrated source code control and work item tracking tool include: automated generation of a list of work items that are completed in a new build of the system; automated updates of work items that are included in a build so that the work item details reflect the build in which it became available; automated transitioning of work items through a workflow when their implementation is complete and when their implementation is available in a new build; validation that source code changes represent the implementation of work items that have been approved; and managing change in the source code system with a focus on the work items it represents rather than a focus on the files that are affected.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 1 is a block diagram of an exemplary system in accordance with the present invention;

FIG. 2 is a diagram of an exemplary user interface in accordance with the present invention;

DETAILED DESCRIPTION OF ILLUSTRATIVE EMBODIMENTS

Figure 3:
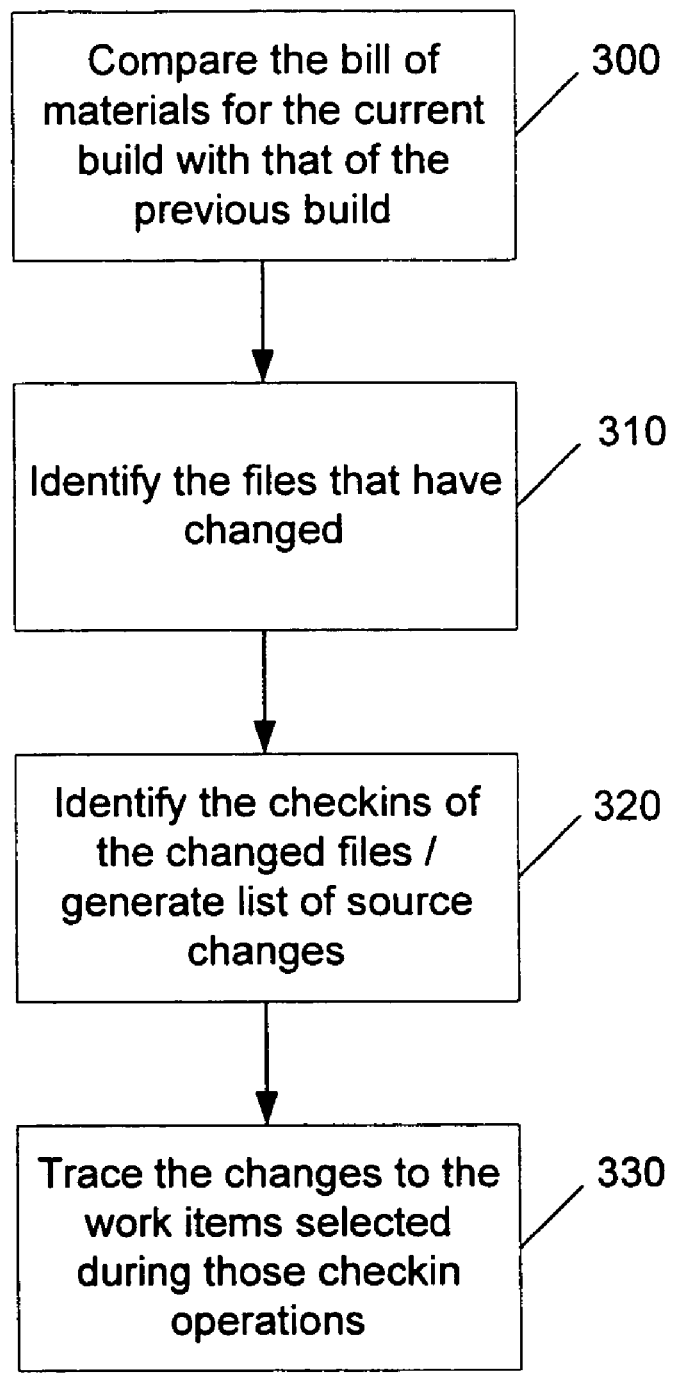
FIG. 3 is a flow diagram of an exemplary method of generating a list of work items completed in a new build in accordance with the present invention.

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

A relationship between source code and work items is established during the checkin process. Scenarios may thereby be enabled or otherwise facilitated through such an integrated source code control and work item tracking system that is able to leverage the relationship between work items and source control in its operation. These scenarios include, for example: automated generation of a list of work items that are completed in a new build of the system; automated updates of work items that are included in a build so that the work item details reflect the build in which it became available; automated transitioning of work items through a workflow when their implementation is complete and when their implementation is available in a new build; validation that source code changes represent the implementation of work items that have been approved; and managing change in the source code system with a focus on what work items it represents rather than a focus on what files are affected.

An exemplary source control system is shown in FIG. 1. An example source control system works by allowing users to make changes to files in their own isolated workspace (e.g., a client) 100, and then publish those changes to a source code repository 120 with a checkin operation. The source code repository 120 may reside within a server, for example. The user may associate one or more work items with the changes being submitted during the checkin operation. This association may, for example, be implemented via a user interface (UI) 200.

An organization may wish to establish checkin policies governing the source code that may be submitted to the source code repository 120. Some examples of checkin policies may include requirements that changes to the source code pass a set of tests, that the source code cleanly compile, and that no source code changes be submitted that are not approved and reviewed by a central committee. The source code repository 120 may be accessible to the software development team members, for example, and checkin policies may be put in place to aid in controlling the source code that is checked into the source code repository 120.

Checkin policies may be defined, disseminated, and enforced, using known techniques. Upon the creation and/or modification of a policy, the policy definition may be transmitted from a policy definition computer to a policy definitions store, e.g., on a policy storage server. The policy definitions store may comprise one or more policy definitions stored in any format. Each policy definition may be stored as an individual file, across multiple files, or multiple definitions may be stored in one file. It is contemplated that a list of policies may be stored in any location anywhere in a system, as the invention is not limited in this respect.

An exemplary UI for associating a work item with changes being submitted during a checkin operation is shown in FIG. 2. A channel selector 210 is provided, and the currently selected channel shown is the "Work Items" channel 220 (shown as "CH. 2"). By selecting the checkbox 230 on one or more work items 240, a relationship is established between source changes and the selected work items during the checkin process. This relationship is desirably persisted in the record of the source change and the work item record.

Once this relationship is established, example scenarios may be enabled. One such example scenario is the automated generation of a list of work items completed in a new build. It is common for development organizations to create a list of work items that are addressed in a build and deliver this list to the team of testers so that they know what features and bug fixes should be tested in the build. This list is typically arduous to create as it requires somebody to collect this information from various sources and type up a document containing the details. However, by maintaining the relationship between source changes and work items, the list can be generated automatically.

A flow diagram of an exemplary method of generating a list of work items completed in a new build is shown in FIG. 3. Source changes that are newly introduced in the build are identified. This can be done, for example, by comparing the bill of materials for the current build with that of the previous build, at step 300. The bill of materials desirably comprises a list of all files and their revisions that were used as inputs to the build. Using these bills of materials, those files that have changed in the time between these builds are identified, at step 310. The checkins in which these files were changed can be identified, at step 320, to create a list of source changes. It is contemplated that other techniques may be used for identifying source changes that are newly introduced in the build.

After the list of source changes is created, tracing to which work items were selected during those checkin operations is performed, at step 330. This creates a list of work items that are newly completed in the build.

Another example scenario that may be enabled by an established relationship between source changes and the selected work items during the checkin process is an automated update of "Fixed In" field (or a similar type field) in work items. It is common for work items stored in a defect tracking system or other type of software development work tracking system to include a "Fixed In" type field that notes the build in which the work defined therein was first available for testing. This provides a mechanism for testers to determine whether a specific feature or bug fix is available in the build they are testing. However, this field is conventionally filled in manually by the developer implementing the work. For several reasons, it is not always possible for a developer to know what build their work items will become available in. These reasons include: the developer may not know the identification of the next build to execute; the next build may not complete successfully; and the next build may not pick up the source changes due to the manner in which the source changes are moved into the main build by the configuration manager.

Figure 4:
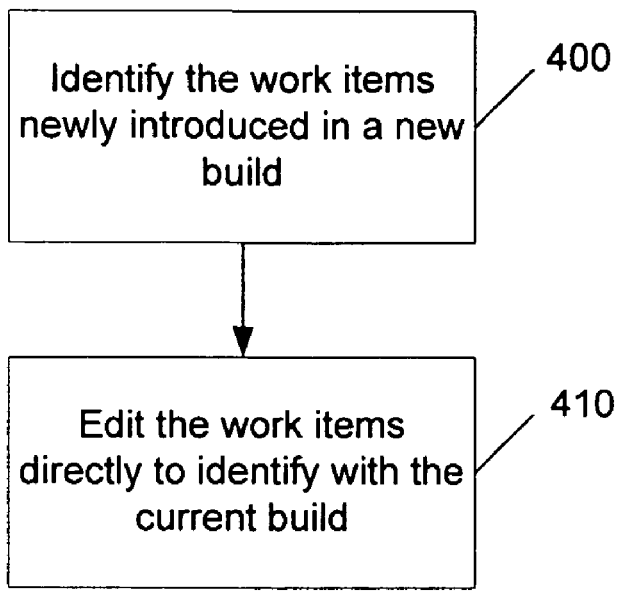
FIG. 4 is a flow diagram of an exemplary method of automatically updating a "Fixed In" field in accordance with the present invention.

A flow diagram of an exemplary method of automatically updating a "Fixed In" type field is shown in FIG. 4. The relationship between source changes and work items is leveraged. A list of work items newly introduced in a new build is generated, at step 400. The list may be generated using the techniques described with respect to FIG. 3, for example. Once this list is generated, the build process can edit the work items directly, at step 410, to fill in the "Fixed In" field with the identification of the current build.

Figure 5:
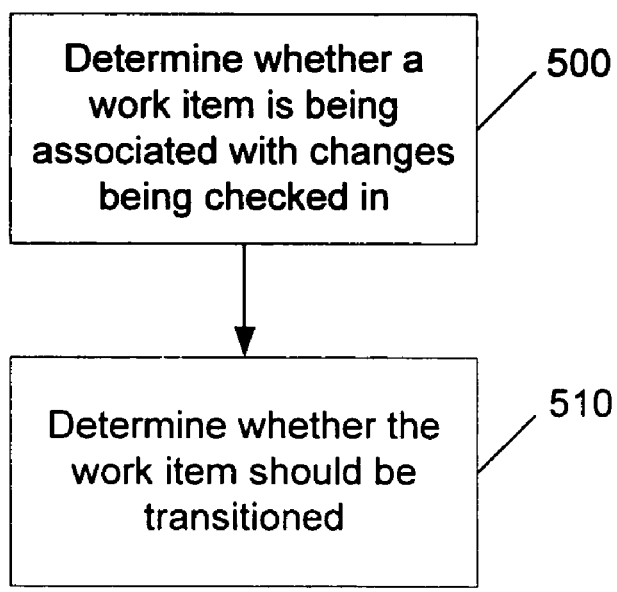
FIG. 5 is a flow diagram of an exemplary method of automated transitioning of work item state during a checkin in accordance with the present invention.

Another example scenario that may be enabled in accordance with the present invention is an automated transitioning of work item state during a checkin. A flow diagram of an exemplary method of automated transitioning of work item state during a checkin is shown in FIG. 5. A common practice for software developers is to mark work items as completed and promote them through a workflow after the source changes that implement the work have been checked in. This is a manual process which often involves leaving the development environment to use another application where work items can be edited.

According to aspects of the invention, a mechanism may be provided to automatically transition work items that are associated with a checkin. Each work item desirably represents an instantiation of a work item type which defines what data is collected in the work item and what workflow the work item should follow. The workflow is defined as a collection of states with transitions between them. Each state in the workflow is allowed to mark a single outbound transition as the state change that should occur during a checkin.

When changes are being checked in, at step 500, it is determined whether a work item is associated with the changes being checked in. If so, at step 510, the user can determine whether or not the work item state should be transitioned. Transitioning the work item would promote it through the work flow.

For example, bugs or code errors may have a state chart that flows from the "active" state to the "resolved" state when the developer has submitted the bug fix, and then to the "closed" state when the testers have validated the bug fix. It is noted that the transition from "active" to "resolved" may coincide with a checkin operation for the bug fix, and it is desirable to automate that transition as part of the checkin process. By defining the "bug" work item type with this automated outbound transition from "active" to "resolved," the once manual process of transitioning the bug after submitting the fix can be automated by a tool that establishes and uses a relationship between source changes and the selected work items during the checkin process.

It may be desirable for the management of a software development team at times to restrict the work that developers are allowed to submit to the source control system. This restriction may be put into place for a variety of reasons, such as, the management team may wish to focus on a small set of blocking issues and minimize the disruption caused by submitting other changes to the system; the management team may wish to limit the volatility of the source code at a time when they are getting close to release; and the management team may wish to enforce a rule that only bug fixes are to be checked into a specific code branch.

Using a checkin policy mechanism, it is possible to restrict the types of changes being submitted based on specific criteria. One of the criteria is that the work items associated with the changes must be approved.

To evaluate policy compliance, a policy evaluation framework may receive checkin information and may evaluate the policy compliance of source code being submitted to a source code repository. The checkin information may include a list of source code files that may be submitted to the source code repository, a list of currently selected work items associated with the source code files, release note information, checkin comments, and any other information, as the invention is not limited in this respect. In some embodiments, an extensible checkin information system may be provided that enables the checkin information to be tailored. For example, a project or team leader may utilize the extensible checkin information system to specify additional checkin information that should be submitted for the checkin of source code for a project. The policy evaluation process may be performed by policy plugins, which may be called from the policy evaluation framework.

Policy compliance may be evaluated based on the received current checkin information and the received policy definition, and the policy compliance information is returned. The returned information may take any form, may indicate policy compliance failure or success, and may further indicate reasons for failure. In one embodiment, the returned information comprises a logical value indicating policy compliance failure or success.

In accordance with an embodiment, a new policy may be created, and/or an existing policy may be edited, deleted, or disabled/enabled.

Policies may be set to apply to all source code in a team project, and/or may possess a scope based on trees, branches or folders in the source code repository, versions of source code and/or specific source code files.

Figure 6:
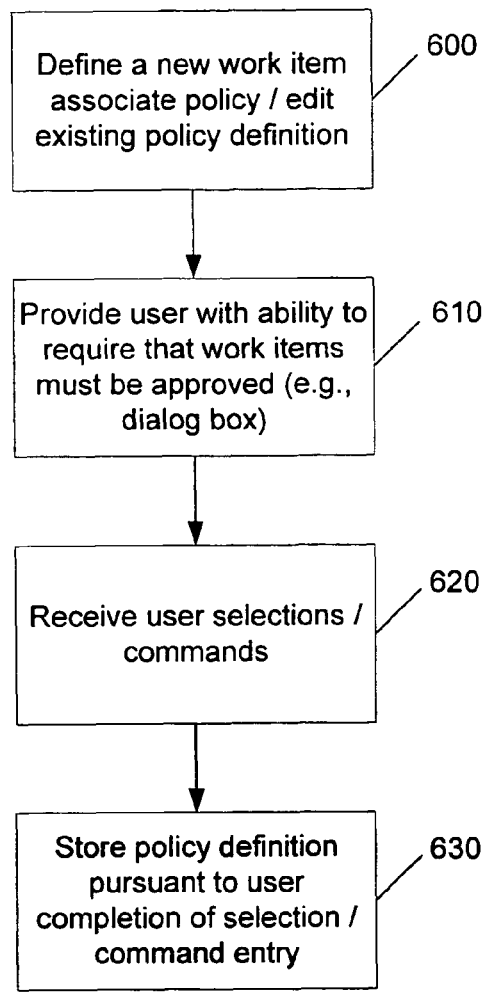
FIG. 6 is a flow diagram of an exemplary method of validating that source changes represent approved work in accordance with the present invention.
Figure 7:
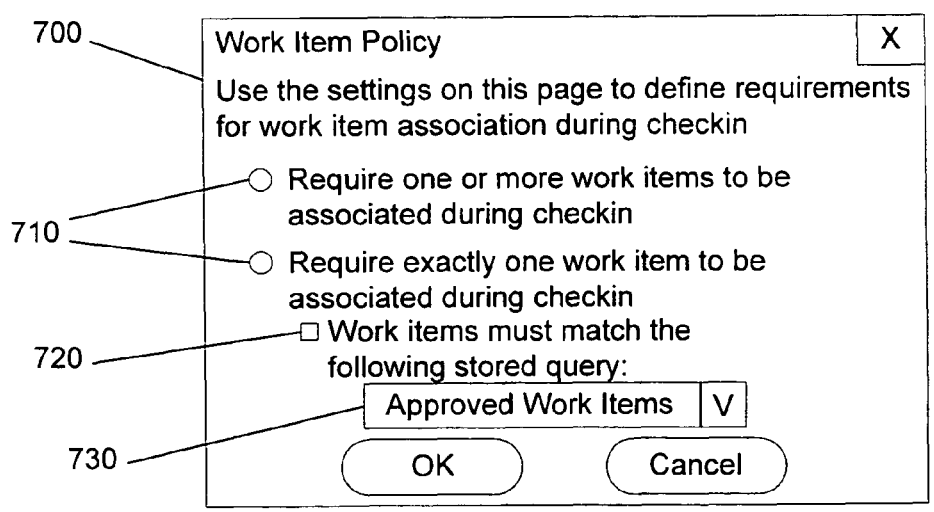
FIG. 7 is a diagram of an exemplary dialog in accordance with the present invention.

A flow diagram of an exemplary method of validating that source changes represent approved work is shown in FIG. 6. A user chooses to define a new work item associate policy or edit an existing policy definition at step 600. A dialog, such as that shown in FIG. 7, for example, is then provided to the user, at step 610.

The user may then select the appropriate fields, at step 620. Example fields on the example dialog 700 include radio buttons 710 that dictate the cardinality of work item association. By default according to an embodiment, the first radio button (e.g., "Require one or more work items to be associated during checkin") is selected. The user can further restrict checkins by selecting the second radio button (e.g., "Require exactly one work item to be associated during checkin"). Check box 720 (e.g., "Work items must match the following stored query:") controls whether more advanced criteria are applied to the work items. By default, the check box 720 is not checked. Checking this box enables the drop-down 730. Drop-down 730 desirably contains a list of the stored public queries for the portfolio project for which this policy is being defined. For example, the drop-down 730 is only enabled when the check box 720 is checked.

At step 630, the user may press the OK button or provide similar type input, and the new policy definition has completed. The policy definition is desirably stored in a storage device that may be associated with the user, a client computer, a server, and/or an independent storage device, for example.

Thus, for example, a project administrator may define the cardinality of work items being associated with a changeset as well as the field-level criteria that those work items must satisfy. For cardinality, a project administrator can require one, or one or more, work items to be associated with a checkin. The defined policy may be stored on the server and distributed to users performing source control activities. Periodically, the policy framework may request that the policy is evaluated. At that time, the current work item selections are evaluated for compliance with the policy. If the current changes comply with the defined policy, no error message is displayed to the user. If, however, the policy is not satisfied, an error or other message is desirably displayed to the user.

A common practice for a software development organization involves moving source changes between branches of the source tree. Aspects of the present invention allow a code base that has been branched to allow for divergent evolution to be synchronized with its various copies.

A typical scenario would involve a user attempting to move a bug fix or a feature from one branch into another. However, bugs and features are work items and the items being moved are source code changes. It is desirable to allow the user to track the work item back to a set of file revisions which contain the source code changes and then move the source code changes between branches. In conventional situations, a direct link between the work item and source changes does not exist and it is left to the person performing the merge operation to make a determination about which changes should be moved for the fix.

With the relationship between source changes and work items established during a checkin in accordance with the present invention, the tool is able to reliably trace from a work item to the associated source changes. This allows the user to explicitly focus on work items during the merge process.

Figure 8:
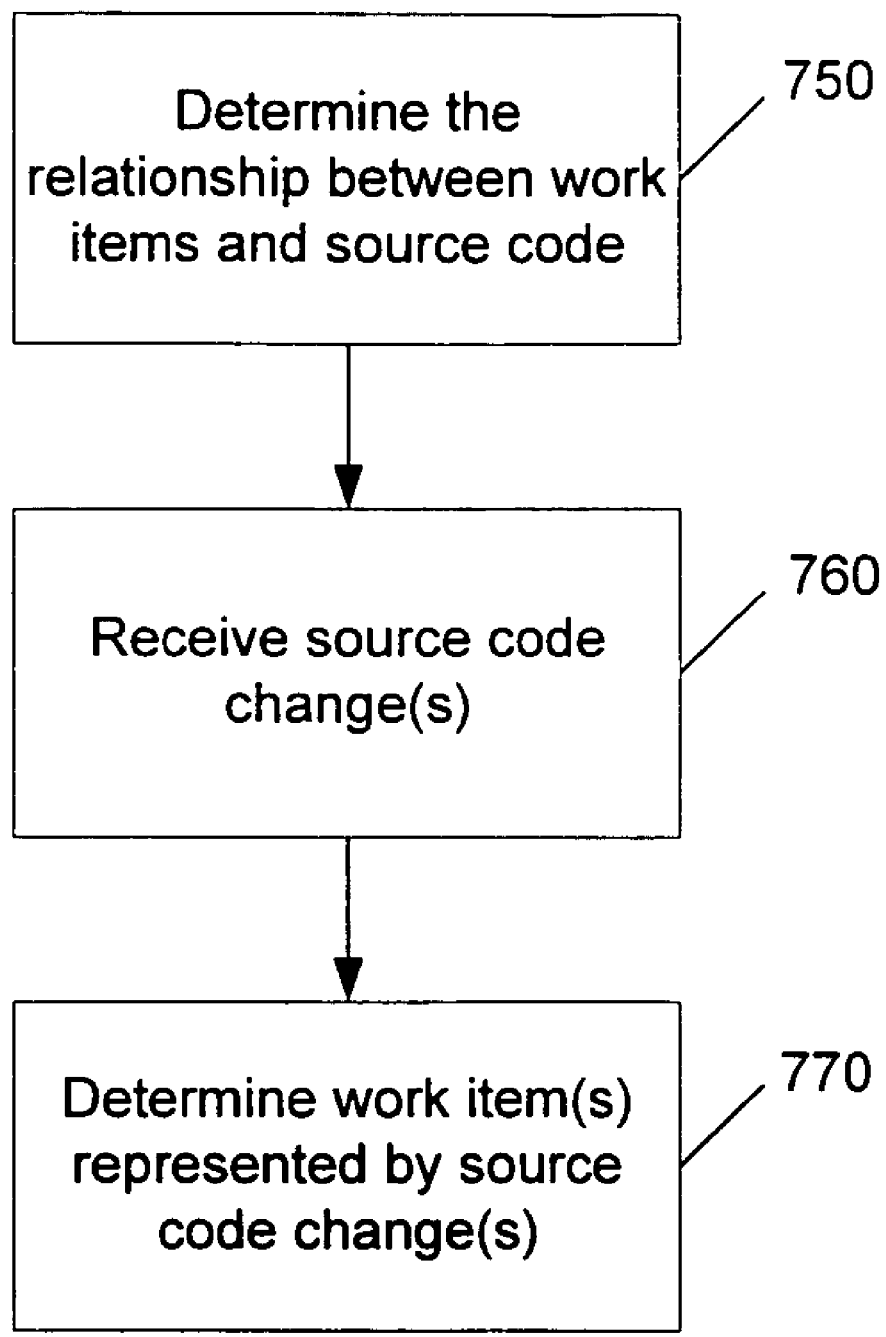
FIG. 8 is a diagram of an exemplary method of managing change with a focus on work items in accordance with the present invention.

A flow diagram of an exemplary method of managing change with a focus on work items is shown in FIG. 8. At step 750, the relationship between the work items and the source code is determined. Source code changes are then received at step 760. At step 770, the work items that are represented by the source code change(s) are then determined. These work items may then be displayed or otherwise provided to the user, for example, for use during a subsequent merge process.

Aspects of the present invention enable changesets to combine work item history, source change history, and test history. This provides an auditable record of the changes with rationale and approval tracked in the work item database. This is often desirable for regulatory compliance.

A changeset is a logical container which may store items related to a single check in operation, such as file and folder revisions, links to related work items, check in notes, a comment, policy compliance and system metadata such as owner name and date/time of check in, for example.

When a set of pending changes is checked in, a new changeset is desirably created in the source control repository and a unique changeset number is assigned to it. Changeset numbers are desirably monotonically increasing (e.g., changeset #3 chronologically replaces precedes changeset #4, and so on). Preferably, no two changesets may have the same date/time of check in. Because of this property, changesets also represent particular points in time for the state of the repository.

To a developer, a changeset number is a unique identifier for a set of related file and folder revisions committed to the repository in a single checkin operation. To the system however, a changeset number is a version number for the entire source control repository at a specific date and time.

At times it may be desirable to return the working environments to an earlier version, for instance two months ago, and make a targeted fix to a specific build. Sometimes, the exact point in time when an individual line of code was introduced may not be known. The ability to specify a changeset enables the restoration of the versions of the files and folders that comprised the state of the repository at the time they were committed to the repository. As such, retrieving a changeset into a workspace enables a user to quickly regain the context desirable to complete new tasks, such as fixing a bug at the point in time when it was introduced, against old versions of the sources.

Additionally, embodiments of the invention may gather test changes (as well as source changes) with the work items. This enables auditability to include changes to tests, which may be desirable regulatory compliance.

The changesets captured this way enable metrics to be gathered by build. For example, code churn may be viewed, along with test results, bug resolution, and task completion by build, which may be more a useful measure than dates.

A detailed build report may be generated for each completed build and for builds that are in progress. Build reports may be arranged by categories such as code coverage results, work items resolved, work items opened due to build failures, and team build errors, for example. Various information may be displayed in these categories, such as identifiers, status, times, tests, results, etc.

An exemplary build summary report is a listing of builds that have completed. The build summary may be opened, for example, when the build summary node is selected. Desirably, information contained in the summary report is read-only. The report may be generated in a table format and the columns can be sorted to assist in searching through the data.

The report may include a filter located in the toolbar upon which a user can filter builds conducted in a specified time frame, such as Today Only, Yesterday Only, Last Week, Last 4 weeks. Moreover, the build summary report may allow a user to refresh the build summary using a refresh button on the toolbar.

Example summary report items included for builds may include Build Name, Build Quality, Completed On, and Build Status. Build Name displays a link to the detailed build report for the build. The name displayed here may be the Build Number with an icon showing success or failed status. Build Quality indicates the current build quality state. Build quality can be edited by right clicking the specific build, for example. The user desirably can add/remove the build quality values. Completed On displays either that the build is in progression or the date and time of build completion, for example. The summary report may be sorted by default on this. Build Status displays an updated status as the build proceeds. Example values of the build status may include build initializing, build started, getting sources from source control, started compilation, compilation completed, started testing, test completed, dropping build to drop site, build completed with success, build completed with failures, and build aborted.

Example Computing Environment

Figure 9:
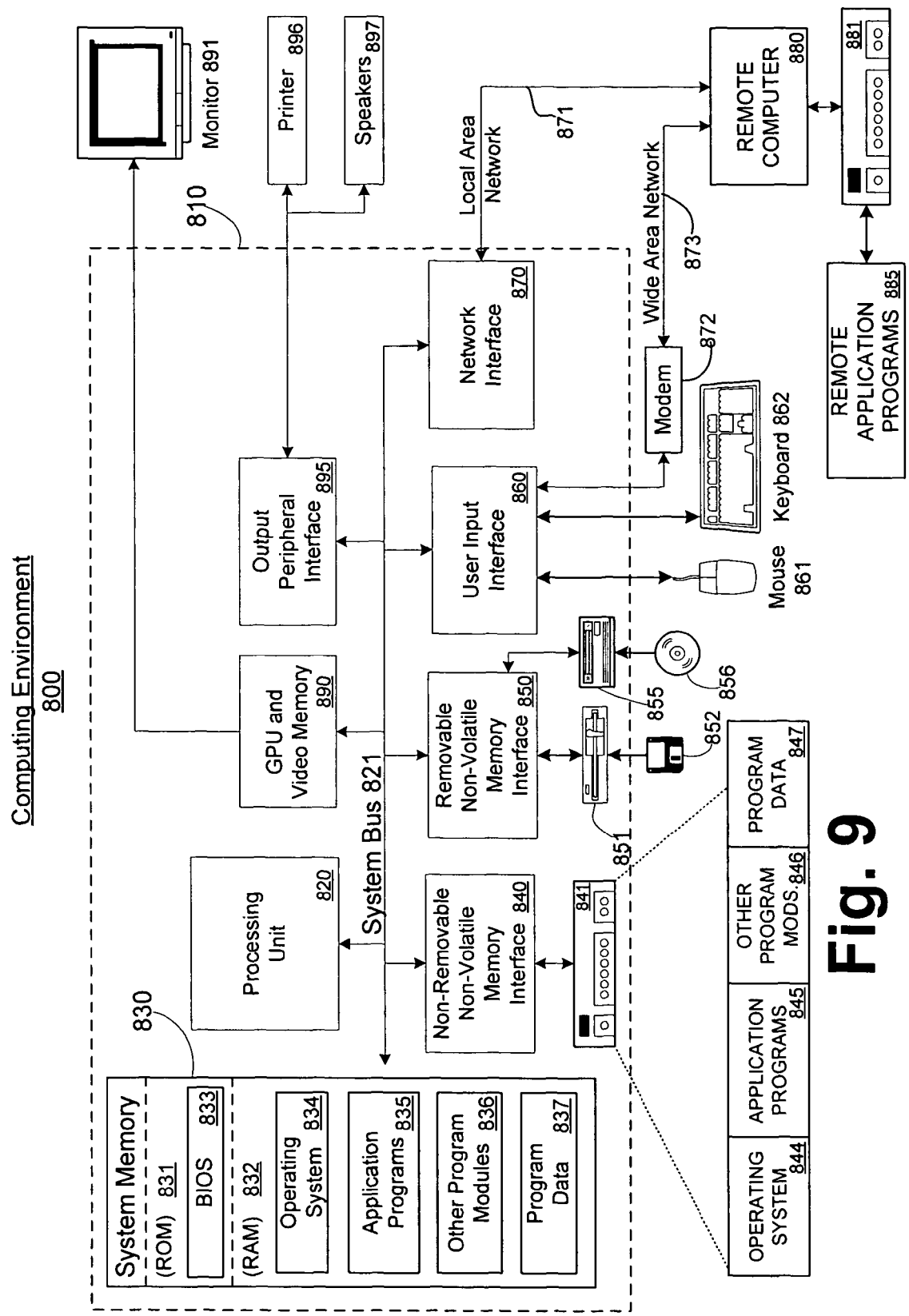
FIG. 9 is a block diagram showing an example computing environment in which aspects of the invention may be implemented.

FIG. 9 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (APT), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 9 thus illustrates an example of a suitable computing system environment 800 in which the invention may be implemented, although as made clear above, the computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

With reference to FIG. 9, an example system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 830 includes computer storage media in the form of volatile and/or nonvolatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837. RAM 832 may contain other data and/or program modules.

The computer 810 may also include other removable/non-removable, volatile/nonvolatile computer storage media. By way of example only, FIG. 9 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 9 provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB).

A monitor 891 or other type of display device is also connected to the system bus 821 via an interface, such as a video interface 890. In addition to monitor 891, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 9. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on memory device 881. It will be appreciated that the network connections shown are exemplary and other means of establishing a communications link between the computers may be used.

One of ordinary skill in the art can appreciate that a computer 810 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed:

1. A processor-implemented method comprising:
   initiating a source code checkin process to submit a source code change to a source code repository;
   during the source code checkin process, using a processor to present a user interface;
   defining a work item type and an automated outbound transition associated with the defined work item type;
   using the user interface to receive a user selection of at least one work item during the source code checkin process;
   establishing a relationship between the at least one work item received from the user selection and the source code change submitted during the source code checkin process;
   in response to a checkin operation, automatically transitioning a work item of the defined work item type based on the automated outbound transition associated with the defined work item type;
   automatically generating a list of work items that are completed in a new system build based on the established relationship; and
   using the user interface to define requirements comprising a first requirement relating to whether one or more work items are to be associated during the source code checkin process, a second requirement relating to whether exactly one work item is to be associated during the source code checkin process, and a third requirement relating to whether one or more work items must match a particular stored query, the relationship between the at least one work item received from the user selection and the source code change submitted during the source code checkin process being established based on the defined requirements.

2. The processor-implemented method of claim 1, wherein generating the list comprises:
   identifying source changes that have been newly introduced in the new system build; and
   determining the list of work items based on the identified source changes and the relationship.

3. The processor-implemented method of claim 2, wherein identifying the source changes comprises:
   comparing a bill of materials for the new system build with a bill of materials for a previous system build;
   identifying files in the bill of materials for the new system build that have changed in the time between the new system build and the previous system build; and
   creating a list of source changes based on the identified files.

4. The processor-implemented method of claim 3, wherein each bill of materials comprises a list of all files and their revisions that were used as inputs to the associated build.

5. The processor-implemented method of claim 4, wherein identifying files comprises identifying checkins in which the files have changed.

6. The processor-implemented method of claim 1, further comprising persisting the relationship in a record of the source code change and a record of the work item.

7. The processor-implemented method of claim 1, further comprising updating work items on the list so that the work item details reflect the build in which it became available.

8. The processor-implemented method of claim 1, further comprising providing the list of work items to a user.

9. The processor-implemented method of claim 1, further comprising managing source code changes based on the related work items.

10. The processor-implemented method of claim 1, further comprising using the list of work items in a merge process.

11. A processor-implemented method comprising:
    initiating a source code checkin process to submit a current source code change to a source code repository;
    during the source code checkin process, using a processor to invoke a function for determining whether any work item is associated with the current source code change based on a relationship established between a work item and a previous source code change;
    defining a work item type and an automated outbound transition associated with the defined work item type;
    during the source code checkin process, invoking a function for automatically performing a work item tracking process based on one or more work items, if any, that are determined to be associated with the current source code change, the work item tracking process comprising determining whether the one or more work items should be transitioned; and
    in response to a checkin operation, automatically transitioning a work item of the defined work item type based on the automated outbound transition associated with the defined work item type, the relationship established between the work item and the previous source code change being established based on requirements comprising a first requirement relating to whether one or more work items are to be associated during the source code checkin process, a second requirement relating to whether exactly one work item is to be associated during the source code checkin process, and a third requirement relating to whether one or more work items must match a particular stored query.

12. The processor-implemented method of claim 11, wherein automatically performing a work item tracking process comprises automatically transitioning the work item.

13. The processor-implemented method of claim 11, wherein automatically performing a work item tracking process comprises automatically identifying the work item and receiving transitioning instructions.

14. The processor-implemented method of claim 11, wherein automatically performing a work item tracking process comprises automatically determining that the implementation of the work item is complete and available in a new build.

15. The processor-implemented method of claim 14, further comprising transitioning the work item through a workflow when their implementation is complete and when their implementation is available in a new build.

16. A processor-implemented method comprising:
  initiating a source code checkin process to submit a source code change to a source code repository;
  during the source code checkin process, using a processor to invoke a process for establishing a relationship between a work item and the source code change that is submitted during said source code checkin process;
  defining a work item type and an automated outbound transition associated with the defined work item type;
  receiving policy information about a policy that is specified based on an established relationship between the source code change and the work item, wherein the policy information comprises a requirement that the source code change is associated with one of at least one work item and exactly one item;
  in response to a checkin operation, automatically transitioning a work item of the defined work item type based on the automated outbound transition associated with the defined work item type; and
  during a subsequent checkin process, enforcing the policy, the relationship between the work item and the source code change that is submitted during said source code checkin process being established based on requirements comprising a first requirement relating to whether one or more work items are to be associated during the source code checkin process, a second requirement relating to whether exactly one work item is to be associated during the source code checkin process, and a third requirement relating to whether one or more work items must match a particular stored query.

17. The processor-implemented method of claim 16, wherein the policy is directed to validating that a source code change represents an approved work item.

* * * * *